(12) United States Patent
Schütz (10) Patent No.: US 12,149,651 B2
(45) Date of Patent: Nov. 19, 2024

(54) TRANSPONDER TAG THAT IS OPERABLE BY A MOBILE TELEPHONE, PORTABLE OBJECT, MOBILE TELEPHONE, AND CORRESPONDING METHODS

(71) Applicant: Matthias Schütz, Olten (CH)

(72) Inventor: Matthias Schütz, Olten (CH)

( * ) Notice: Subject to any disclaimer, the term of this patent is extended or adjusted under 35 U.S.C. 154(b) by 0 days.

(21) Appl. No.: 16/806,718

(22) Filed: Mar. 2, 2020

(65) Prior Publication Data

US 2022/0182481 A1 Jun. 9, 2022
US 2024/0214483 A9 Jun. 27, 2024

Related U.S. Application Data

(63) Continuation of application No. 15/523,885, filed as application No. PCT/EP2015/075649 on Nov. 3, 2015, now Pat. No. 10,586,087.

(51) Int. Cl.
*H04M 1/72412* (2021.01)
*H04B 1/59* (2006.01)
*H04W 4/80* (2018.01)

(52) U.S. Cl.
CPC .......... *H04M 1/72412* (2021.01); *H04B 1/59* (2013.01); *H04W 4/80* (2018.02)

(58) Field of Classification Search
CPC ....... H04M 1/72412; H04B 1/59; H04W 4/80
USPC ........................................................ 455/418
See application file for complete search history.

(56) References Cited

U.S. PATENT DOCUMENTS

| | | | |
|---|---|---|---|
| 9,864,882 B1* | 1/2018 | Geist | G06K 7/10158 |
| 2004/0162106 A1* | 8/2004 | Monroe | H04W 88/06 |
| | | | 455/552.1 |
| 2007/0103303 A1* | 5/2007 | Shoarinejad | H04W 76/40 |
| | | | 340/572.1 |
| 2009/0203399 A1* | 8/2009 | Rofougaran | H04M 1/72412 |
| | | | 340/572.1 |
| 2010/0159953 A1 | 6/2010 | Aubert et al. | |
| 2011/0260839 A1 | 10/2011 | Cook | |
| 2012/0242294 A1* | 9/2012 | Muth | H02J 50/20 |
| | | | 320/137 |
| 2013/0324059 A1* | 12/2013 | Lee | H04W 52/0209 |
| | | | 455/127.1 |

(Continued)

FOREIGN PATENT DOCUMENTS

WO WO-2005043270 A2 * 5/2005 ............. G06F 16/48
WO WO 2006/092220 A2 9/2006
WO WO 2014/177984 A2 11/2014

*Primary Examiner* — Tanmay K Shah (57) ABSTRACT

The present invention relates to a transponder tag that is operable by a mobile telephone, a mobile telephone for operating such a transponder tag, a method of operating the transponder tag, and a method for detecting the presence of a portable object. The transponder tag comprises a receiving unit for receiving a wireless input signal. The transponder tag is configured to obtain energy from the received input signal and to use the energy obtained from the input signal for transmitting by way of a wireless short-range connection a wireless output signal that corresponds to a tag information of the transponder tag. The receiving unit is configured to receive a wireless input signal at a frequency of at least one uplink band of a mobile telephone network. In this way, radiation energy of the mobile phone is used to achieve an energy-efficient and reliable operation of the transponder tag.

23 Claims, 4 Drawing Sheets

(56) References Cited

U.S. PATENT DOCUMENTS

| | | |
|---|---|---|
| 2014/0055262 A1 | 2/2014 | Cavalcanti |
| 2014/0135042 A1 | 5/2014 | Buchheim |
| 2014/0155029 A1* | 6/2014 | Kolaks .................. H04W 12/08 |
| | | 455/411 |
| 2016/0078261 A1* | 3/2016 | Schütz .................. H04W 64/00 |
| | | 340/10.1 |
| 2016/0292980 A1 | 10/2016 | H. Kazerouni |
| 2017/0180934 A1 | 6/2017 | Brice |
| 2017/0270323 A1* | 9/2017 | Butler .............. G06K 19/07749 |
| 2017/0373892 A1* | 12/2017 | Ganesan ............. H04B 17/318 |

* cited by examiner

TRANSPONDER TAG THAT IS OPERABLE BY A MOBILE TELEPHONE, PORTABLE OBJECT, MOBILE TELEPHONE, AND CORRESPONDING METHODS

TRANSPONDER TAG THAT IS OPERABLE BY A MOBILE TELEPHONE, PORTABLE OBJECT, MOBILE TELEPHONE, AND CORRESPONDING METHODS

This is a continuation of U.S. patent application Ser. No. 15/523,885 with a filing date of May 2, 2017, which was the National Stage of International Application No. PCT/EP2015/075649 filed on Nov. 3, 2015.

TECHNICAL FIELD OF THE INVENTION

The present invention relates to a transponder tag that is operable by a mobile telephone, a portable object with such a transponder tag, a mobile telephone for operating such a transponder tag, a method of operating the transponder tag, and a method for detecting the presence of a portable object.

BACKGROUND OF THE INVENTION

Transponder tags and the use of a mobile telephone for locating objects carrying such transponder tags are well known. For example, WO 2006/092220 A2 describes a method for preventing the loss of keys that are connected to an RFID transponder tag. If the user loses/misplaces his keys, he can review the stored location information and with the knowledge of the most recently known location the user has a good chance to retrieve the lost keys. The power supply for the RFID transponder tags is provided by an RFID signal, which is wirelessly transmitted from the mobile telephone to the RFID transponder tag.

Also, WO 2014/177984 A2 describes an RFID-enable mobile telephone that is used for detecting correspondingly tagged objects. In contrast thereto, US 2011/0260839 A1 uses tags with an energy-harvesting circuit and the mobile telephone communicates with the tag according to a WLAN or Bluetooth communication protocol.

SUMMARY OF THE INVENTION

The present invention has the objective to propose an improved transponder tag, an improved portable object, an improved mobile telephone, an improved method of operating the transponder tag, and an improved method for detecting the presence of a portable object.

This objective is met by a transponder tag according to the invention, a portable object with such a transponder tag and a method of operating such a transponder tag.

The present invention concerns a transponder tag that is operable by a mobile telephone and that comprises a receiving unit for receiving a wireless input signal. The transponder tag is configured to obtain energy from the received input signal and to use the energy obtained from the input signal for transmitting by way of a wireless short-range connection a wireless output signal that corresponds to a tag information of the transponder tag. The receiving unit is configured to receive a wireless input signal at a frequency of at least one uplink band of a mobile telephone network. In this way, radiation energy of the mobile phone is used to achieve an energy-efficient and reliable operation of the transponder tag as long as the latter is located within a short distance of the mobile phone. This is useful for numerous applications. For example a person may use his/her mobile telephone to obtain a quick overview and/or a reliable confirmation that all his/her personnel belongings, e.g. keys or a medicine container, are "on board" at the moment the person leaves home.

The term "tag information" is used for all kinds of tag-related information such as for example the presence or absence of a signal received from the transponder tag, in particular a signal strength, a frequency, a phase relation, a propagation time or a round trip time, and further the information associated with and/or stored in the transponder tag, in particular its identification (ID), security information or further data such as numbers or coded data.

The term "mobile telephone network" includes all kind of different communication networks, in particular voice and/or data networks, to which the mobile telephone is connectable for transferring information. In one example, the mobile telephone network is a telecommunications network such as cellular network. In another example, the mobile telephone network is a local wireless network, in particular an ISM radio connection (Industrial, Scientific, and Medical), for example a BLE (Bluetooth Low Energy) or a WLAN (IEEE 802.11 standard) connection.

The transponder tag does not need a previously charged internal power supply in order to start operating. For operating the transponder tag an external power source is sufficient, i.e. receiving radiation energy via an antenna of the transponder tag, and the transponder tag is configured to be energized by the received input signal. The transponder tag is very convenient and reliable, because there is no need to use batteries, which may degrade and/or may require replacement. This is particularly useful for checking seldom used objects.

Surprisingly the tag according to the invention is very efficient, reliable and convenient, because the user can easily and instantly check and/or confirm the presence of his portable objects, for example, at the moment when he starts walking away from a place, e.g. his office or his home. Such a check and/or confirmation can be performed without losing time, even when the user is in a hurry. Thus, under the concept of the present invention, the risk of leaving the portable objects behind is avoided right at the beginning of the journey.

Further, the user obtains instant confirmation of having all of his portable objects with him, which gives peace of mind and avoids unpleasant or embarrassing searches. This is particularly advantageous for handicapped and/or elderly persons.

In an embodiment of the invention, the transponder tag, in particular the receiving unit and/or a transmitting unit of the transponder tag, has a wireless operational range of 0.2 m to 2 m, in particular 0.3 m to 1.5 m, further in particular 0.4 m to 1.0 m. In this way, an energy-efficient and reliable tag communication between tag and a corresponding sender device respectively receiver device such as a mobile telephone, is achieved.

The transponder tag has a wireless operational range such that the transponder tag is able to receive the uplink signal of mobile telephone, if the mobile telephone is located in the vicinity of the transponder tag. In an ideal case of undisturbed radiation propagation the wireless operational range may be represented by a sphere with a radius equal to the wireless operational range, in particular a radius of the above mentioned ranges.

The limited range prevents the reception of a wireless signal from distances which are not relevant. If the wireless operational range is less than specified above, portable objects that are located near the mobile telephone will be detected and there is evidently no point for the user to search for them. If on the other hand the wireless operational range is more than specified above, the user or the evaluation unit may erroneously conclude that a remotely located operational tag is nearby. Thus, the configuration as specified above achieves improved reliability combined with energy savings.

In an embodiment of the invention, the receiving unit, in particular an antenna and/or an impedance-matching network thereof, is a multiband receiving unit and/or has a bandwidth of at least 20 MHz, in particular at least 50 MHz, further in particular at least 100 MHz. In this way, a high flexibility and independence from a specific technology is achieved. For example the receiving unit is able to receive energy independently of the uplink frequency.

For example, the receiving unit of the tag may comprise an antenna for receiving a wireless signal and for providing an electrical signal that corresponds to the received wireless signal and further comprises a power supply unit that is connected to the receiving unit for receiving the electrical signal and configured for obtaining energy from the received signal.

In a further embodiment of the method according to the invention, the receiving unit comprises at least one omni-directional antenna, in particular one or more dipoles and/or more circular polarized antennas, which further in particular are arranged in an antenna array. This way, a substantially constant delivery of energy is achieved, irrespective of the position of the tag relative to the corresponding reader device (such as a mobile telephone).

In a further embodiment of the tag according to the invention, the receiving unit is configured to receive the wireless input signal at a UHF frequency and/or at a frequency that differs from the frequency band of the wireless short-range connection by at least 20 MHz, in particular at least 50 MHz, further in particular at least 100 MHz. This reduces or avoids interference between the wireless signals. The UHF (Ultra-high frequency) range extends between 0.3 and 3 GHz.

In an embodiment of the transponder tag according to the invention, the receiving unit is configured to receive the wireless input signal at a frequency band, the center frequency of which differs from the center frequency of the band of the wireless short-range connection by at least 5 MHz, in particular at least 10 MHz, further in particular at least 20 MHz.

In a further embodiment of the transponder tag according to the invention, the short-range connection is operated at a frequency of the uplink band, in particular at a sub-band and/or channel that different from the sub-band and/or channel used by the wireless input signal.

In another example, the receiving unit is configured to receive the wireless input signal at a frequency that is within the frequency band of the wireless short-range connection.

In a further embodiment of the tag according to the invention, the transponder tag comprises a receiving antenna and a separate transmission antenna arranged in particular on opposite sides of the transponder tag.

In a further embodiment of the tag according to the invention, the at least one uplink band is a band of a cellular network, in particular of a GSM, UMTS or LTE network, further in particular of a 1800 MHz telecommunication band. This allows the use of globally accepted frequency bands and standard multiband mobile telephones. In particular, the 1800 MHz telecommunication band allows for the use of a universal transponder tag, i.e. a 1800-MHz transponder tag that is accepted by the worldwide majority of legislations.

In a further example, the uplink of a local wireless network, in particular an ISM radio band is used, for example a WLAN-Band.

In a further embodiment of the transponder tag according to the invention, the at least one uplink band is an ISM radio band, in particular a band with a frequency of 2 GHz or more, further in particular in a frequency range of 2,4-2.5 GHz, 5,725-5,875 GHz or 24-24,25 GHz.

In an example of the tag according to the invention, the transponder tag comprises a transmitting unit, which is energized by the energy arriving in the receiving unit. The transmitting unit is configured to use the received energy for transmitting the wireless output signal. In a further example the transponder tag comprises an energy-storing unit that is connected to the receiving unit and/or to the transmitting unit. The energy-storing unit is configured to store the received energy and to provide the stored energy as a power supply for reading the tag information of the transponder tag and/or for transmitting the wireless output signal.

Further, the transponder tag may be identified by its ID (e.g. a unique identification number), a specific code, the frequency or a phase relation of the received transponder signal.

In a further embodiment of the transponder tag according to the invention, the wireless short-range connection is based on low-energy technology, in particular Bluetooth BLE, ANT, ZigBee or RFID technology.

In one example, the low-energy technology uses a transmitter, which has a maximum power consumption during transmission of less or equal than 30 mW, in particular less or equal than 20 mW, further in particular of less or equal then 10 mW.

In a further embodiment of the transponder tag according to the invention, the wireless short-range connection is a unidirectional connection and/or a broadcast connection, i.e. signal transmission without response expected. This significantly reduces energy consumption.

In a further example the wireless short-range connection transmits information only when requested by mobile telephone and/or in response of being called by the mobile telephone. This reduces or avoids collisions during data transmissions and avoids wasting of energy for transmitting unused information.

BLE is a Bluetooth protocol (also called Bluetooth low energy, Bluetooth LE, Bluetooth Smart or Bluetooth Version 4.0 and higher) that operates in the 2.4 GHz ISM band at 2400-2483.5 MHz and differs from the standard Bluetooth protocol, also called Classic Bluetooth (version below 4.0), by substantially reduced power consumption. The BLE frequency band is divided into 40 channels with center frequencies at:

$$2402 \text{ MHz} + k*2 \text{ MHz, where } k=0, \ldots, 39.$$

In one example, BLE is configured to stay uncoupled and/or in an advertising mode, in particular exclusively uses one or more of the BLE advertising channels 37-39. In another example BLE uses an advertizing interval of more than 50 ms, in particular more than 100 ms, further in particular more than 500 ms. This way a particularly energy efficient BLE operation is achieved and interference with the uplink transmission is reduced or avoided.

In one embodiment of the invention, the wireless short-range connection is a BLE-connection using the advertising bands, in particular at least one of: advertising channel 37

(center frequency 2402 MHz), advertising channel 38 (center frequency 2426 MHz) and advertising channel 39 (center frequency 2480 MHz).

In one embodiment of the invention, which may explicitly be combined with any of the previous embodiments, the frequency of wireless input signal is of a WLAN-band, in particular with a bandwidth of 22 MHz and at least one of: channel 1 (center frequency 2412 MHz), channel 6 (center frequency 2437 MHz) and channel 11 (center frequency 2462 MHz).

Further, ANT is an ultra-low-power, short-range wireless technology and operates in the 2.4-GHz ISM band with a proprietary protocol developed and sold by Dynastream Innovations Inc. ZigBee (IEEE 802.15.4) is a low-power wireless standard for low data rate, also in the ISM band.

The RFID technology as described in WO 2006/092220 A2 provides battery-free tag operation, where the tag antenna is energized by a RF signal from an interface circuit of the mobile telephone, if the tag is within the transmit range of the interface circuit.

In a further embodiment of the transponder tag and/or the mobile telephone according to the invention, the wireless short-range connection is based on RFID technology, wherein the transponder tag is configured to backscatter a signal received from the mobile telephone, in particular by far-field backscatter coupling, and/or the transponder tag comprises a tag antenna, a so called transceiver antenna, which is energized by an RF signal received from the mobile telephone.

The backscattering operation is accomplished by receiving RF radiation from the mobile telephone and by reflecting a corresponding signal back to the mobile telephone. Thus, the mobile telephone provides the energy for the communication connection. The transformation of information from the transponder tag to the mobile telephone is accomplished by modulating the backscattered signal by changing the impedance of the transceiver circuit of the transponder tag, i.e. changing the impedance of the transmitting unit, in particular an antenna and/or an impedance matching network thereof.

In a further embodiment of the transponder tag according to the invention, the transponder tag comprises a switch for changing the impedance of a circuit used for backscattering and/or the impedance of the transceiver antenna. This configuration has the advantage that there is no load attached to the backscattering antenna of the transponder tag and thus the effort of designing and implementing a transceiver impedance matching network is reduced or eliminated. This way a particularly energy efficient, small sized and robust transponder tag can be achieved.

In one example, the switch is a wideband switch, which provides a high isolation and low insertion loss. Thus, the transponder tag reflects at least part of received signal back to the mobile telephone as a wireless backscattered signal, which is modulated according to impedance changes, which in turn are controlled by the control unit of the transponder tag, which may for example be implemented by an integrated circuit (IC) and/or a finite-state machine.

In a further example, the transponder tag comprises a transmitting unit, which is configured to change the impedance of the transmitting unit, in particular an antenna and/or an impedance matching network thereof, autonomously and/or asynchronously.

In another example the wireless short-range connection operates according to the interrogator-talks-first (ITF) or the tag-talks-only-after-listening (TOTAL) principle. This reduces or completely avoids interference problems with other transponder tags.

The combination of uplink harvesting with RFID technology is most energy efficient. The harvested uplink energy provides the energy for operating the transponder tag, in particular energy for operating a control unit thereof (e.g. an integrated circuit (IC) and/or a microprocessor) and/or for controlling the impedance changes (e.g. for operating a switching unit). On the other hand, the energy used for the wireless information transfer is provided by backscattering technology. Thus, the solution according to the invention is most energy efficient and avoids the effort that the transponder tag needs to generate its own wireless carrier signal. In addition, the transponder tag can be implemented in a simple way, because there is no need to gain energy from the received RFID signal and all the energy from the received RFID signal can be used for backscattering. This way a highly efficient and robust transponder tag detection and/or mobile phone operation is achieved.

In an example, the RFID technology is defined according to ISO 18000-6B or the EPC Global Gen2 standard (860-960 MHz or 902-928 MHz).

The EPC Global Gen2 standard (also known as EPC class 1 Gen2, short Gen2 or ISO 18000-6C) uses the ISM frequency band and is specifically designed for worldwide operability. The standard defines the physical and logical requirements for a passive-backscatter, Interrogator-talks-first (ITF), radio-frequency identification (RFID) system operating in the 860 MHz-960 MHz frequency range, wherein a passive tag is a tag whose transceiver (combination of a transmitter unit and receiver unit) is powered by the RF field.

In another example, the RFID technology is defined according to the ISO 18000-4 standard, which defines wireless transmission in the 2.45 GHz ISM band. This way particularly small sized tag antennas can be achieved, which is advantageous for tagging small sized objects.

In one example the transponder tag comprises an energy-storing unit, in particular an intermediate storage unit, which comprises at least one capacitor or at least one battery for providing power to the controlling unit of the transponder tag. This way, all of the energy from the mobile telephone can be used for backscatter.

Further, the invention concerns a transponder tag operable by a mobile telephone and comprising a receiving unit for receiving a wireless input signal, wherein the transponder tag is configured to obtain energy from the received input signal and to use the energy for transmitting by way of a short-range connection a wireless output signal that corresponds to a tag information of the transponder tag, and wherein the receiving unit and/or the short-range connection is configured to operate at a frequency of an ISM band.

In a further embodiment of the tag according to the invention, the transponder tag is configured for transmitting the wireless output signal autonomously and/or asynchronously, in particular by one-way communication. This avoids protocol and synchronization effort and provides a very energy efficient transmission. Collision control is not required because the transponder tag retransmits the tag information anyway.

Further, the invention concerns a portable object, in particular an individualized object and/or personal item, that comprises one or more (at least one) transponder tags according to any one of the preceding tag embodiments. In particular the transponder tags are arranged at different surfaces of the object and/or according to a periodical pattern, further in particular according to an array. For example, the portable object may be of a kind not worn on the body of the owner, such as a watch or glasses.

The term "portable object" as used in this description of the present invention is an item that is connected to the transponder tag, also called tagged object or simply object. Such a portable object may be any kind of item typically taken along wherever one may be going, in addition to the mobile telephone, in particular a valuable and/or important item. For example the portable object could be a wallet, a key such as a car key, an office key or an apartment key, but also a passport or a personal card such as an identification card, a driver's license, a health card or a credit card, also items for travelling, such as a map, a PDA, a personal computer, a flash memory device, a briefcase, a document, further a piece of luggage or a personal article such as a medicine container, a personal hygiene bag, a case for glasses (e.g. reading glasses or sunglasses), or a pocket knife.

Further, the invention concerns a mobile telephone for operating a transponder tag, in particular the transponder tag according to any one of the previous tag embodiments, wherein the mobile telephone comprises a transmission unit for emitting a wireless signal at a frequency of at least one uplink band of a mobile telephone network. The transmission unit is switchable to a frequency that corresponds to at least one receiving frequency of the transmission tag, in particular to a frequency of the 1800 MHz telecommunication band. This allows a matching to the frequency of the transponder tag, which in turn means, that a universal transponder tag can be used.

The term "mobile telephone" includes all kinds of portable end-user devices of a wireless wide area telecommunication network. Thus, the mobile telephone provides a wireless telecommunication connection, which in turn provides one or more telecommunication services to the user such as a voice connection and/or data transmission, e.g. e-mail or SMS. For example, the mobile telephone is a cellular telephone, which is part of a cell-structured telecommunication network such as a GSM, UMTS or LTE network. Further, the mobile telephone is intended to be a personally worn device.

In one example, the mobile telephone comprises a sender, a receiver and one or more antennas for providing the telecommunication connection and/or a SIM card for providing the telecommunication services. In another example, the mobile telephone comprises an audio unit with a microphone and an acoustic transducer, e.g. a loudspeaker, for providing audio communication to the user of the mobile telephone. In a further example, the mobile telephone comprises a user input interface such as a button or touch screen and/or a user output interface such as a display (screen) or touch screen. In a further example, the emitting of the wireless signal comprises emitting at least one signal burst, in particular a series and/or a predetermined number of signal bursts. For example such a burst corresponds to a synchronization signal, a heartbeat or keep alive signal or a data burst such as a time-slot of a TDMA telecommunication network, in particular a 577 ſ s time-slot in a GSM network.

In a further embodiment of the preceding mobile telephone embodiment, the mobile telephone comprises a user control interface for enabling the user to control the point in time for emitting the wireless signal and/or the frequency of the emitted wireless signal.

Further, the invention concerns a method of operating a transponder tag, in particular a transponder tag according to one of the previous tag embodiments. The method comprises the steps of:
receiving a wireless input signal at a frequency of an uplink band of a mobile telephone network;
obtaining energy from the received wireless input signal; and
using the obtained energy for transmitting a wireless output signal that corresponds to a tag information of the transponder tag from the transponder tag to a mobile telephone via a short-range wireless connection.

In this way, radiation energy of the mobile phone is used to achieve an energy-efficient and reliable operation of the transponder tag located within close vicinity of the mobile phone.

Further, the invention concerns a method for detecting the presence of at least one portable object in a wireless operational range of a mobile telephone, the method comprises the steps of:
attaching the transponder tag to the portable object;
operating a mobile telephone for emitting a wireless signal at a frequency of at least one uplink band of a mobile telephone network;
operating the transponder tag according to the preceding method embodiment;
receiving the tag information of the transponder tag via the short-range wireless connection; and
presenting the tag information to the user of the mobile telephone for indicating the presence of the at least one portable object.

In a further embodiment of the preceding mobile telephone embodiment, the step of operating the mobile telephone comprises the step of switching the frequency of the emitted wireless signal to a frequency that corresponds to at least one receiving frequency of the transmission tag and/or emitting the wireless signal under user control, in particular by the user selecting the frequency of the emitted wireless signal.

The uses and advantages of the above mentioned method also apply to the mobile telephone, the remote unit and the application program product and vice versa. Further, it is expressly pointed out that any combination of the abovementioned embodiments, or any combination of combinations, is considered to lie within the scope of the present invention. Only those combinations are excluded that would result in a contradiction.

BRIEF DESCRIPTION OF THE DRAWINGS

Below, the present invention is described in more detail by means of exemplary embodiments and the attached drawings, wherein.

BRIEF DESCRIPTION OF THE INVENTION

The embodiments described herein are meant as illustrative examples and shall not limit the invention.

Figure 1:
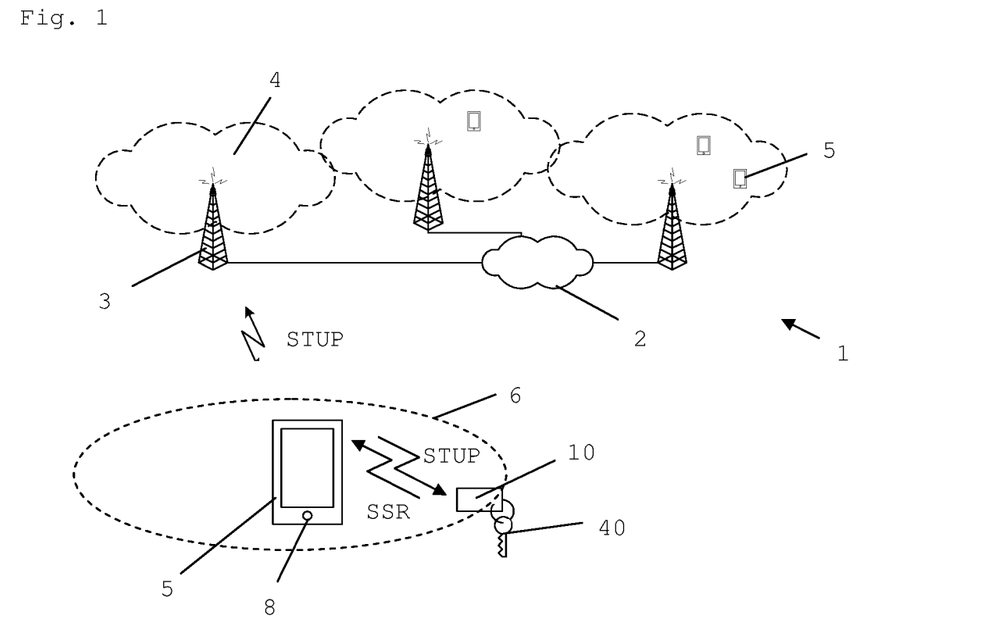
FIG. 1 shows a simplified illustration of a cellular telecommunication system, a mobile telephone and a key with a transponder tag according to the invention.

FIG. 1 shows a simplified illustration of a cellular telecommunication network 1, a mobile telephone 5 with a button 8 and a key 40 with a transponder tag 10 according to the invention.

The key 40 is an example of a portable object in the sense of the invention, i.e. a personal item intended to be carried around with the transponder tag 10 attached thereto. The mobile telephone 5 is activated to determine information related to the transponder tag 10, specifically to the key 40, and to present this information to the user of the mobile telephone 5, for example the presence or absence of the key 40 in the near vicinity of the mobile telephone 5.

The cellular telecommunication network 1 is schematically indicated by three base stations 3, which are connected to a wide area network 2, schematically indicated by a cloud symbol. Each of the base stations 3 comprises a radiation cell 4 surrounding the base station 3, schematically indicated by a dashed cloud symbol. The radiation cells 4 define a cellular structure, namely a substantially two-dimensional field of radiation cells. A number of mobile telephones 5 (schematically indicated by small mobile telephones in the radiation cells), are wirelessly connected to their assigned base station 3. The mobile telephones 5 may communicate with each other via the base stations 3 and, as the case may be, via the wide area network 2. Connections to a fixed-wire network and to the internet are also possible (not shown). For example, the cellular telecommunication network 1 is a GSM telecommunication network and the diameter of the radiation cell 4 is typically between 1 km and 20 km.

The mobile telephone 5 is also connected to the cellular telecommunication network 1 via a wireless connection, i.e. the mobile telephone 5 is within the radiation cell 4 of at least one of the base stations 3 and exchanges telecommunication signals with this base station 3.

The wireless connection in the direction away from the mobile telephone 5 is called an "uplink" connection or an uplink signal STUP (indicated by arrows pointing away from the mobile telephone 5). The uplink signal STUP is intended for transmitting data from the mobile telephone 5 to the base station 3, but since the mobile telephone 5 also radiates in other directions, this uplink signal STUP also reaches the transponder tag 10. The opposite direction, i.e. from the base station 3 to the mobile telephone 5 is called downlink connection.

The wireless connection in the direction away from the mobile telephone 5 is called an "uplink" signal STUP (indicated by arrows pointing away from the mobile telephone 5). The uplink signal STUP is intended for transmitting data from the mobile telephone 5 to the base station 3, but since the mobile telephone 5 also radiates in directions different from the nearest base station 3, this uplink signal STUP reaches the transponder tag 10 as well.

The transponder tag 10 is connected to the mobile telephone 5 by a wireless short-range connection for transmitting a wireless output signal SSR from the transponder tag 10 to the mobile telephone 5 (indicated by an arrow pointing towards the mobile telephone 5). In this example, the short-range wireless connection is a low power Bluetooth connection, also called BLE or smart Bluetooth connection.

The mobile telephone 5 has a wireless operational range 6, which surrounds the mobile telephone 5 like a sphere (schematically indicated by the dotted line). The transponder tag 10 is located within the wireless operational range 6 of the mobile telephone 5 and hence the transponder tag 10 is able to receive sufficient energy from the mobile telephone 5 to activate the transponder tag 10 and to transmit a signal from the transponder tag 10 to the mobile telephone 5 via the short-range wireless connection SSR.

In this example, the wireless operational range 6 is approximately 1.5 meter (drawing is not to scale), such that transponder tags 10 located in the near vicinity of the mobile telephone 5 and thus in the near vicinity of the user. Thus the transponder tag 10 is reliably detectable and the wirelessly transmitted tag information is unambiguously readable.

In operation, the mobile telephone 5 emits an uplink signal, either automatically and/or periodically or, as an alternative, initially and/or on user request, and notifies the networking system 1 of the presence of the mobile telephone 5 within a cell of the networking system 1.

If the user queries for tag information, for example if he wishes to confirm that his keys are nearby somewhere in his coat, he may initiate a search for the tag 10 by pushing the button 8. Accordingly, the mobile telephone 10 transmits an uplink signal STUP for energizing the transponder tag 10, in this example at a transmission power of 0.5 Watt ERP, which provides a wireless operational range of approx. 1.5 m. Having been energized, the transponder tag 10 transmits the wireless output signal SSR. After having received the wireless output signal SSR from the transponder tag 10, the mobile telephone 10 displays the tag information on its display.

Figure 2:
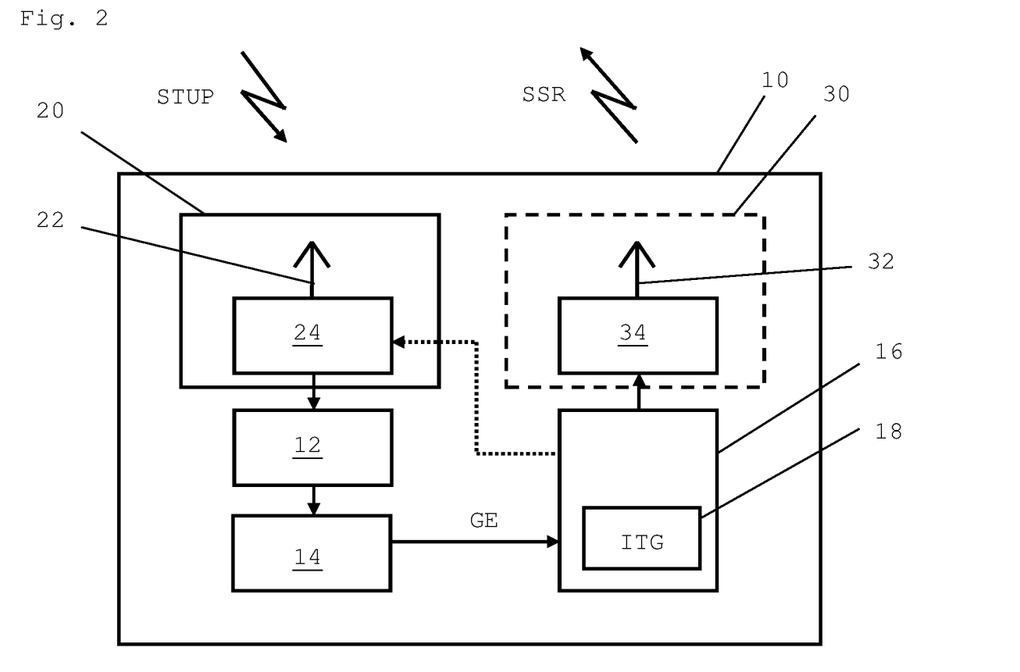
FIG. 2 a simplified block diagram illustrating an embodiment of the transponder tag according to the invention and according to FIG. 1.

FIG. 2 shows a simplified block diagram illustrating an embodiment of the transponder tag 10 according to the invention and according to FIG. 1.

The transponder tag 10 comprises a receiving unit 20, a rectifying unit 12, an intermediate storage unit 14, a controlling unit 16 and a transmitting unit 30. For example, the rectifying unit 12 is implemented by a zero-bias Schottky diode such as an Avago HSMS-285C.

The receiving unit 20 comprises a receiving antenna 22 and a receiving impedance matching network 24 such as an LC circuit and the transmitting unit 30 comprises a transmitting antenna 32 and a transmitting impedance matching network 34. In another example the receiving unit 20 may also be used for transmitting the short-range signal instead of the transmitting unit 30, if the frequency of the receiving unit 20 is matched appropriately (indicated by the dotted and dashed lines).

The receiving unit 20, in particular the first antenna 22 and the first impedance matching networking 24, is configured to receive the wireless input signal STUP at a UHF frequency of an uplink band of a cellular network, in this example of a GSM and also of an LTE network.

The wireless short-range connection is based on low energy technology, in this example a Bluetooth BLE technology. The frequency of the wireless Bluetooth short-range connection at 2400 MHz differs from the frequency of the 1800 MHz uplink band of a cellular network by approximately 600 MHz.

The controlling unit 16 comprises a non-volatile memory unit 18, which is configured to store tag information ITG of the transponder tag 10. The controlling unit 16 may be implemented by a microprocessor, in particular a digital and/or programmable processor.

Figure 3:
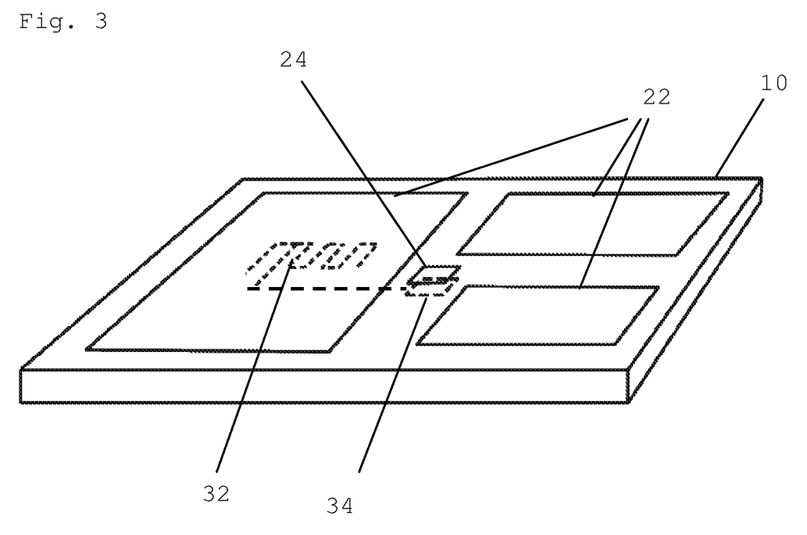
FIG. 3 a simplified perspective view illustrating an embodiment of the transponder tag according to FIG. 2 with multiple receiving antennas.

FIG. 3 shows a simplified perspective view illustrating an embodiment of the transponder tag 10 according to FIG. 2 with multiple receiving antennas 22.

The receiving antenna 22 is an omnidirectional and multiband antenna that is configured as an assembly of three parts, each adapted to receive a wireless input signal at a different receiving frequency. Each part is configured as a folded dipole. In another example, the receiving antenna 22 is implemented as one or more spiral antennas.

In this example, the substrate of the transponder tag 10 is FR4 and the antennas are made from copper wire. However, other metals such as copper or aluminum, in particular in form of tape or printed conductive ink, may also be used.

The receiving antenna 22 and the transmission antenna 32 are arranged on opposite sides of the transponder tag 10. This reduces interference between the antennas to a minimum.

Figure 4:
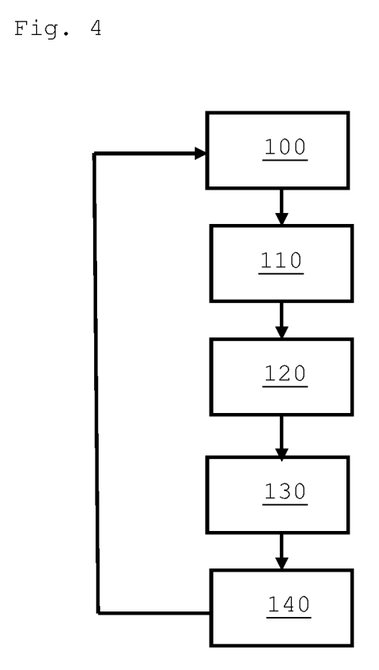
FIG. 4 a simplified flow diagram illustrating the method according to the invention for operating the transponder tag according to FIG. 2.

FIG. 4 shows a simplified flow diagram illustrating the method according to the invention for operating the transponder tag according to FIG. 2.

In this example, the method performs a number of steps, depicted as blocks 100, 110, 120, 130 and 140. The steps are explained by the following instructions, wherein the reference signs refer to FIG. 1 and FIG. 2:

Block 100: receiving a wireless input signal STUP at a frequency of an uplink band of a mobile telephone network 1.

Block 110: obtaining energy EG from the received wireless input signal STUP.

Block 120: collecting the obtained energy EG by using an intermediate storage unit 14.

Block 130: activating the transponder tag 10 by use of the collected energy from the intermediate storage unit 14.

Block 140: transmitting a wireless output signal SSR that corresponds to tag information ITG of the transponder tag 10 from the transponder tag 10 to a mobile telephone 5 via the short-range wireless connection and returning to block 100.

Thus, according to the above method, as long as the transponder tag 10 receives sufficient energy, the transponder tag 10 operates autonomously and asynchronously and continuously transmits the wireless output signal SSR to the mobile telephone 5 via a one-way communication.

Figure 5:
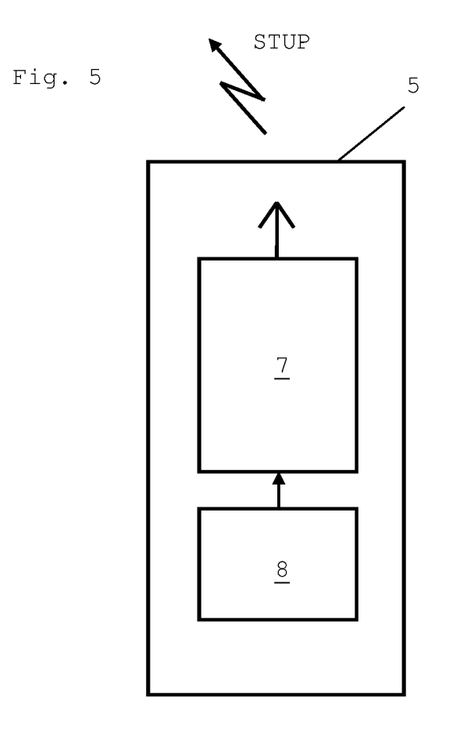
FIG. 5 a simplified block diagram illustrating an embodiment of the mobile phone according to the invention and according to FIG. 1 with a user controlled transmitting unit.

FIG. 5 shows a simplified block diagram illustrating an embodiment of a mobile phone 5 according to the invention and according to FIG. 1 with a user-controlled transmitting unit 7 and a user control interface 8.

The mobile telephone 5, also called a smart phone, is a personal device for all kinds of daily activities such as making phone calls, exchanging messages and e-mails, or accessing personal information, for example consulting a calendar or taking notes. The mobile telephone 5 comprises a telecommunication unit 7, which comprises a sender, a receiver and a telecommunication antenna.

In operation, the transmission unit 7 emits a wireless signal STUP at a frequency of at least one uplink band of a mobile telephone network. The transmission unit 7 is switchable to a frequency that corresponds to at least one receiving frequency of the transmission, in this example to a frequency of the 1800 MHz telecommunication band.

Figure 6:
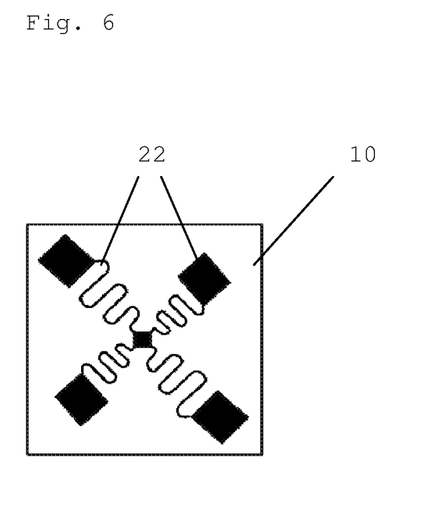
FIG. 6 a simplified top view illustrating an embodiment of the transponder tag according to FIG. 2 with a dual band receiving antenna.

FIG. 6 shows a simplified top view illustrating an embodiment of the transponder tag according to FIG. 2 with a dual band receiving antenna 22.

Each of antennas 22 is built as a meandering symmetrical dipole with broadened, square-like outer end portions. Each dipole 22 is adapted to a specific frequency of an uplink band of a mobile telephone network 1. The angle of approximately 90° between the dipoles helps to reduce interference between the two antennas 22.

Figure 7:
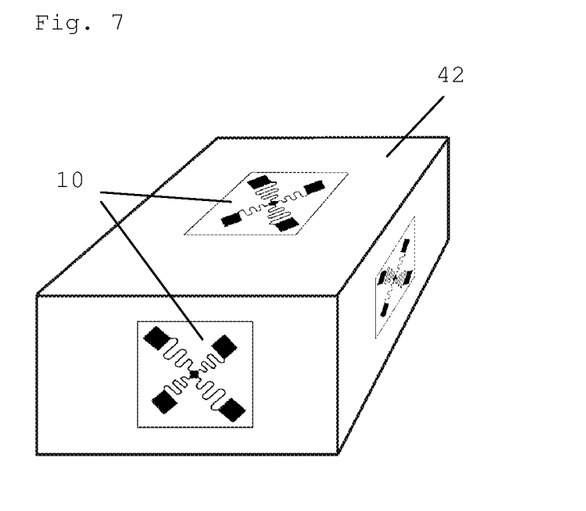
FIG. 7 a simplified perspective view illustrating a portable object with multiple transponder tags according to FIG. 6.

FIG. 7 shows a simplified perspective view illustrating a medicine container 42 as a portable object with multiple transponder tags 10 according to FIG. 6.

The medicine container 42 is an individualized object and a personal item carrying one or more transponder tags 10, which are arranged at each of the different surfaces of the medicine container 42 (only 3 transponder tags 10 visible). This arrangement of the transponder tags 10 guarantees an optimal positioning of the at least one of the transponder tags 10 in relation to the mobile telephone 5 (see FIG. 1), irrespective of the orientation of the medicine container 42.

Figure 8:
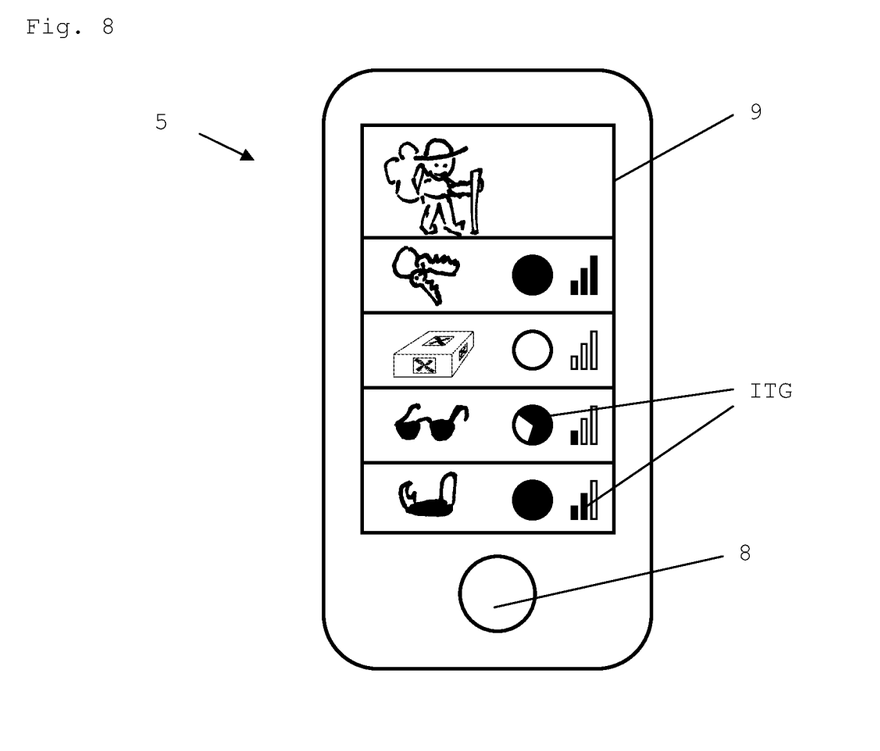
FIG. 8 a simplified illustration showing the presentation of tag information on a display of the mobile telephone according to FIG. 5.

FIG. 8 shows a simplified illustration showing the presentation of tag information ITG on a display 9 of the mobile telephone 5 according to FIG. 5.

The mobile telephone has a button 8 as a user control interface to enable the user to control the point in time for emitting the wireless signal and the frequency of the emitted wireless signal.

In this example, the display 9 shows a scenario "hiking", as indicated in the header of the display 9. This scenario includes a list of 4 pictograms representing 4 portable objects, which the user has configured in advance according to his personal preferences and needs, in this case: a bunch of keys, the medicine container 42 according to FIG. 7, sunglasses and a pocket knife.

After the user has pushed the button 8, an application program on the mobile telephone 5, the mobile telephone 5 and the transponder tag 10 (see FIG. 1) perform the method according to the invention, and the tag information ITG is presented on the display 9. The tag information ITG shows for each of the objects, whether the respective object is recognized as present in the wireless operational range of the mobile telephone (indicated by differently filled circles). In this case the bunch of keys and the pocket knife are found present; the medicine container 42 is missing, and the presence of the sunglasses is uncertain. In addition, the display 9 also indicates the received signal strength (indicated by filled bars of increasing size). Thus, the user is also informed about doubtful cases, in this case the sunglasses.

Figure 9:
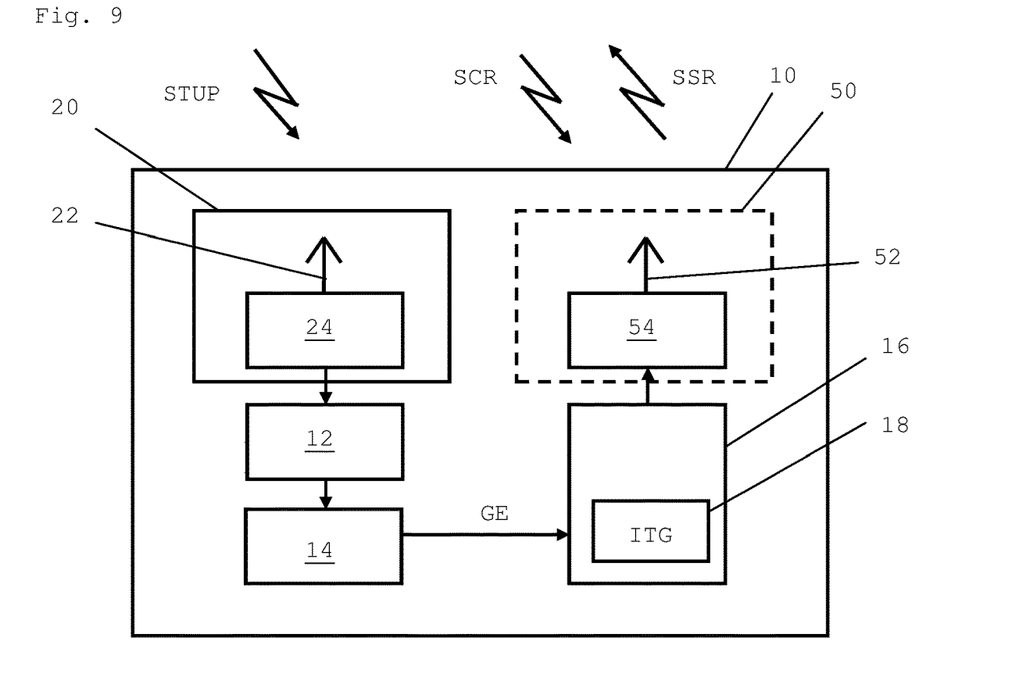
FIG. 9 a simplified block diagram illustrating a further embodiment of the transponder tag according to FIG. 2 with a RFID transceiver.

FIG. 9 shows a simplified block diagram, which illustrates an embodiment of the transponder tag 10 according to FIG. 2, wherein the wireless short-range connection is based on RFID technology, i.e. the transmitter unit of the transponder tag 10 is configured to be operated by RFID technology. The transmitter unit combines transmitting and receiving functionality and is therefore called a transceiver. Thus, the transponder tag 10 comprises a transceiver 50 with a transceiver antenna 52 and a transceiver impedance matching network 54.

In operation, the transceiver antenna 52 of the transponder tag 10 receives a carrier signal SCR from the mobile phone 5 (shown in FIG. 1) and backscatters (reflects) at least a part of the received signal back to the mobile phone as short range signal SSR. The carrier signal SCR together with the wireless short-range signal SSR provides a far-field coupling between the mobile phone and the transponder tag 10 and the tag antenna 52 is energized by carrier signal SCR (an RF signal) from the mobile telephone and hence the mobile telephone provides the energy for the communication connection.

The transmission of information from the transponder tag 10 to the mobile telephone is accomplished by modulating the backscattered signal by changing the impedance of the transceiver 50, in particular by changing the impedance of the transceiver antenna 52 and/or the transceiver impedance matching network 54. The transceiver 50 is further connected to the controlling unit 16 such that the controlling unit 16 (e.g. integrated circuit (IC) and/or the microprocessor) controls the modulation of the backscattered signal according to the stored tag information IGT.

Figure 10:
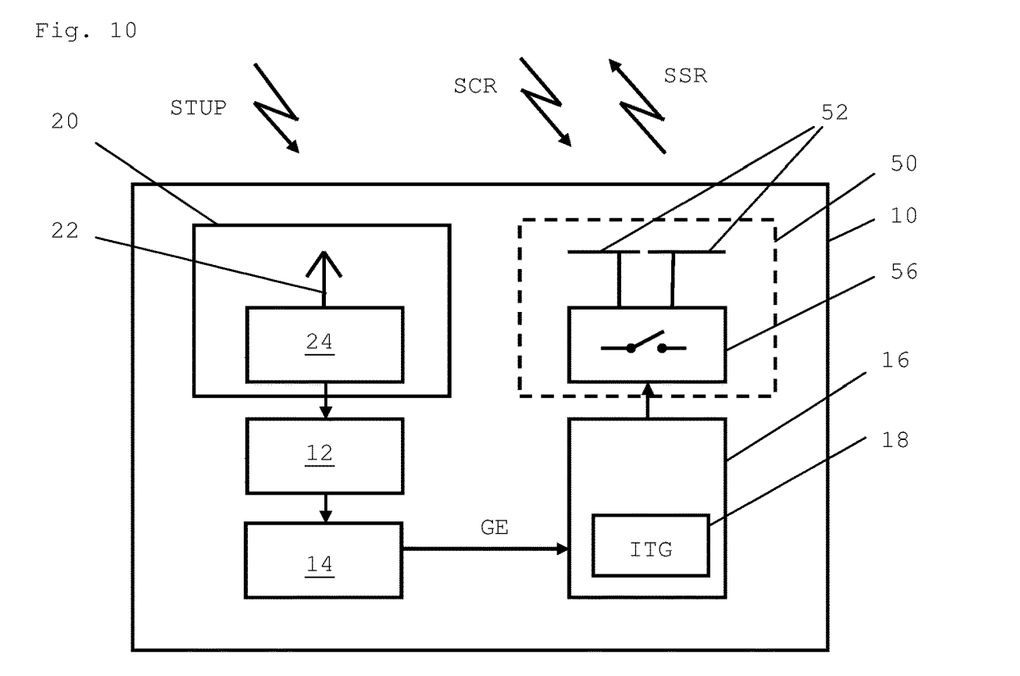
FIG. 10 a simplified block diagram illustrating a further embodiment of the transponder tag according to FIG. 9 with a switch for backscatter modulation.

FIG. 10 shows a simplified block diagram illustrating a further embodiment of the transponder tag 10 according to FIG. 9 with a switch 56 for modulating the backscattered signal.

In this example the switch 56 is a wideband switch, which uses a CMOS process to provide high isolation and low insertion loss, for example an ADG902 RF from Analog Devices. The switch 56 is directly connected to the transceiver antenna 52, which in this case is schematically illustrated as a simple dipole antenna. On the other hand the switch 56 is connected to the controlling unit 16 for receiving control commands. Thus, the controlling unit 16 controls the modulation of the backscattered signal by switching between isolating resp. conducting states according to the stored tag information IGT.

The invention claimed is:

1. A transponder tag comprising a receiving unit for receiving a wireless input signal from a mobile telephone, wherein the transponder tag is configured to obtain energy from the received wireless input signal and to use said energy for providing a wireless short-range connection from the transponder tag to said mobile telephone,
wherein the wireless short-range connection is based on RFID technology and the transponder tag is configured to provide the wireless short-range connection by backscattering at least a part of a RF radiation from said mobile telephone and to modulate the backscattered signal according to a tag information of the transponder tag.

2. The transponder tag according to claim 1, wherein the short-range connection provides a wireless operational range of 0.2 m to 2 m or 0.3 m to 1.5 m or 0.4 m to 1.0 m.

3. The transponder tag according to claim 1, wherein the receiving unit is a multiband receiving unit and/or has a bandwidth of at least 20 MHZ or at least 50 MHz or at least 100 MHz.

4. The transponder tag according to claim 1 comprising an energy-storing unit, in particular an intermediate storage unit, which comprises at least one capacitor or at least one battery for providing power to a controlling unit of the transponder tag.

5. The transponder tag according to claim 4, wherein the transponder tag is configured to collect the energy obtained from the received wireless input signal and to store the collected energy in the energy-storage.

6. The transponder tag according to claim 1, wherein the receiving unit is configured to receive the wireless input signal at a UHF frequency and/or at a frequency band that differs from the frequency band of the wireless short-range connection by at least 20 MHz, in particular at least 50 MHz or at least 100 MHZ.

7. The transponder tag according to claim 1, wherein the transponder tag comprises a controlling unit for controlling the modulating and/or a receiving antenna and a separate transmission antenna, arranged in particular on opposite sides of the transponder tag.

8. The transponder tag according to claim 1, wherein the wireless input signal is part of an uplink band of a cellular network, in particular of a GSM, UMTS or LTE network, or part of a local wireless network band, in particular an ISM radio band, further in particular a WLAN-Band.

9. The transponder tag according to claim 1, wherein the transponder tag is configured for transmitting the wireless output signal autonomously and/or asynchronously, in particular by one-way communication.

10. A portable object comprising one or more transponder tags according to claim 1, wherein the one or more transponder tags are arranged according to least one of:
at different surfaces of the portable object,
a periodical pattern, and
an array.

11. A mobile telephone configured to receive tag information from the transponder tag according to claim 1 via the wireless short-range connection, wherein the mobile telephone comprises:
a transmission unit for emitting the wireless input signal and the RF radiation to the transponder tag,
a receiving unit for receiving the backscattered signal from the transponder tag,
wherein the transmission unit is switchable to a frequency that corresponds to at least one receiving frequency of the transponder tag.

12. The mobile telephone according to claim 11, comprising a user control interface for enabling the user to control the point in time for emitting the wireless signal and/or the frequency of the emitted wireless signal.

13. The mobile telephone according to claim 11 configured for receiving the short-range connection as one-way communication, in particular as broadcast or advertising communication.

14. The mobile telephone according to claim 11 configured such that the mobile telephone provides a carrier signal such that the carrier signal together with the signal of the wireless short-range connection provides a far-field coupling between the mobile telephone and the transponder tag.

15. The transponder tag according to claim 1, wherein the transponder tag is configured to backscatter the RF radiation by using far-field backscatter coupling.

16. The transponder tag according to claim 1 configured to modulate the reflected signal by changing the impedance of a transceiver circuit of the transponder tag, in particular an antenna impedance and/or a matching network impedance.

17. The transponder tag according to claim 1, wherein the receiving unit is configured to receive the wireless input signal at a frequency band, the center frequency of which differs from the center frequency of a band of the wireless short-range connection by at least 5 MHz or at least 10 MHZ or at least 20 MHz.

18. The transponder tag according to claim 1 configured to provide the short-range connection as one-way communication, in particular as broadcast or advertising communication.

19. The transponder tag according to claim 1 configured such that a carrier signal from the mobile telephone together with the signal of the wireless short-range connection provides a far-field coupling between the mobile phone and the transponder tag.

20. A method of operating a transponder tag that comprises a receiving unit, the method comprising:
   receiving via the receiving unit a wireless input signal;
   obtaining energy from the received wireless input signal; and
   using the obtained energy for providing a RFID technology based short-range wireless connection from the transponder tag to a mobile telephone by backscattering at least a part of a RF radiation from said mobile telephone and modulating the reflected signal according to a tag information of the transponder tag.

21. The method according to claim 20, wherein the operating of the sender device comprises at least one of:
   emitting a wireless input signal,
   providing the RF radiation,
   switching the frequency of an emitted wireless signal to a frequency that corresponds to at least one receiving frequency of the transponder tag; and
   emitting a wireless signal under user control, in particular by user selecting the frequency of the emitted wireless signal.

22. Method according to claim 20 comprising emitting of a wireless signal and/or providing of the RF radiation by transmitting a series of signal bursts and/or a predetermined number of signal bursts.

23. Method according to claim 20, wherein the wireless input signal is received from an external power source and/or from said mobile telephone.

* * * * *